US012748936B2

(12) United States Patent
Etchebehere Juan et al.

(10) Patent No.: US 12,748,936 B2
(45) Date of Patent: Sep. 29, 2026

(54) DETERMINING PRINTING FLUID AMOUNTS BASED ON COLORANT BOUNDARIES

(71) Applicant: Hewlett-Packard Development Company, L.P., Spring, TX (US)

(72) Inventors: Sergio Etchebehere Juan, Sant Cugat del Valles (ES); David Peinado Gutierrez, Sant Cugat del Valles (ES); Alexandre Rodriguez Llofriu, Sant Cugat del Valles (ES); Peter Morovic, Sant Cugat del Valles (ES); Pau Costal Fornells, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 287 days.

(21) Appl. No.: 18/613,628

(22) Filed: Mar. 22, 2024

(65) Prior Publication Data

US 2025/0299009 A1 Sep. 25, 2025

(51) Int. Cl.
*G06K 15/00* (2006.01)
*G06K 15/02* (2006.01)

(52) U.S. Cl.
CPC ....... *G06K 15/407* (2013.01); *G06K 15/1881* (2013.01)

(58) Field of Classification Search
CPC .. G06K 15/407; G06K 15/1881; B41J 2/2114
See application file for complete search history.

(56) References Cited

U.S. PATENT DOCUMENTS

2006/0071991 A1* 4/2006 Yamanobe ............ B41J 2/2114 347/95
2007/0126831 A1* 6/2007 Suzuki ............... C08F 220/302 347/100
2010/0290089 A1* 11/2010 Stevens ................. H04N 1/405 358/3.06
2011/0274455 A1* 11/2011 Valladares ............ G03G 15/50 399/49
2013/0061767 A1* 3/2013 Casals .................... B41J 2/2114 101/202
2014/0092441 A1* 4/2014 Nishizaki ........... G06K 15/1881 358/3.06
2017/0165990 A1* 6/2017 Barkley ..................... B41J 2/21
2017/0182790 A1* 6/2017 Hayashida ............. B41J 2/2132
2023/0023168 A1 1/2023 Echevarria Benito et al.
2023/0129355 A1* 4/2023 Maestro Garcia ... G06K 15/102 358/1.8

* cited by examiner

*Primary Examiner* — Juan M Guillermety
(74) *Attorney, Agent, or Firm* — Jordan IP Law, LLC

(57) ABSTRACT

In a source image to be printed, a boundary condition between a first region including a first colorant and a second region including a second colorant may be identified based on a difference of respective weighted colorant contributions of the first colorant and the second colorant. In response to identifying the boundary condition, additional treatment fluid may be applied.

17 Claims, 9 Drawing Sheets

Total drops of colorant

| | | | | | |
|---|---|---|---|---|---|
| 3 | 3 | 3 | 3 | 3 | 3 |
| 3 | 3 | 3 | 3 | 3 | 3 |
| 0 | 0 | 2 | 2 | 3 | 3 |
| 0 | 0 | 2 | 2 | 3 | 3 |
| 0 | 0 | 2 | 2 | 3 | 3 |
| 0 | 0 | 2 | 2 | 3 | 3 |

P-plane

| | | | | | |
|---|---|---|---|---|---|
| 1 | 1 | 1 | 1 | 1 | 1 |
| 1 | 1 | 1 | 1 | 1 | 1 |
| 0 | 0 | 0 | 1 | 1 | 1 |
| 0 | 0 | 1 | 0 | 1 | 1 |
| 0 | 0 | 0 | 1 | 1 | 1 |
| 0 | 0 | 1 | 0 | 1 | 1 |

Contones
(C,M,Y,K)

Channel Halftones

Cyan

| | | | | | |
|---|---|---|---|---|---|
| 0 | 0 | 0 | 0 | 0 | 0 |
| 0 | 0 | 0 | 0 | 0 | 0 |
| 0 | 0 | 1 | 1 | 0 | 0 |
| 0 | 0 | 1 | 1 | 0 | 0 |
| 0 | 0 | 1 | 1 | 0 | 0 |
| 0 | 0 | 1 | 1 | 0 | 0 |

Magenta

| | | | | | |
|---|---|---|---|---|---|
| 0 | 0 | 0 | 0 | 0 | 0 |
| 0 | 0 | 0 | 0 | 0 | 0 |
| 0 | 0 | 1 | 1 | 0 | 0 |
| 0 | 0 | 1 | 1 | 0 | 0 |
| 0 | 0 | 1 | 1 | 0 | 0 |
| 0 | 0 | 1 | 1 | 0 | 0 |

Yellow

| | | | | | |
|---|---|---|---|---|---|
| 3 | 3 | 3 | 3 | 3 | 3 |
| 3 | 3 | 3 | 3 | 3 | 3 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

Black

| | | | | | |
|---|---|---|---|---|---|
| 0 | 0 | 0 | 0 | 0 | 0 |
| 0 | 0 | 0 | 0 | 0 | 0 |
| 0 | 0 | 0 | 0 | 3 | 3 |
| 0 | 0 | 0 | 0 | 3 | 3 |
| 0 | 0 | 0 | 0 | 3 | 3 |
| 0 | 0 | 0 | 0 | 3 | 3 |

Total drops of colorant

| | | | | | |
|---|---|---|---|---|---|
| 3 | 3 | 3 | 3 | 3 | 3 |
| 3 | 3 | 3 | 3 | 3 | 3 |
| 0 | 0 | 2 | 2 | 3 | 3 |
| 0 | 0 | 2 | 2 | 3 | 3 |
| 0 | 0 | 2 | 2 | 3 | 3 |
| 0 | 0 | 2 | 2 | 3 | 3 |

P-plane

| | | | | | |
|---|---|---|---|---|---|
| 1 | 1 | 1 | 1 | 1 | 1 |
| 1 | 1 | 1 | 1 | 1 | 1 |
| 0 | 0 | 0 | 1 | 1 | 1 |
| 0 | 0 | 1 | 0 | 1 | 1 |
| 0 | 0 | 0 | 1 | 1 | 1 |
| 0 | 0 | 1 | 0 | 1 | 1 |

FIG. 5

F-plane

| | | | | | |
|---|---|---|---|---|---|
| 306 | 306 | 306 | 306 | 306 | 306 |
| 306 | 306 | 306 | 306 | 306 | 306 |
| 0 | 0 | 75 | 75 | 306 | 306 |
| 0 | 0 | 75 | 75 | 306 | 306 |
| 0 | 0 | 75 | 75 | 306 | 306 |
| 0 | 0 | 75 | 75 | 306 | 306 |

F plane Halftone

| | | | | | |
|---|---|---|---|---|---|
| 3 | 3 | 3 | 3 | 3 | 3 |
| 3 | 3 | 3 | 3 | 3 | 3 |
| 0 | 0 | 1 | 1 | 3 | 3 |
| 0 | 0 | 1 | 1 | 3 | 3 |
| 0 | 0 | 1 | 1 | 3 | 3 |
| 0 | 0 | 1 | 1 | 3 | 3 |

P-plane adjustment

| | | | | | |
|---|---|---|---|---|---|
| 0 | 0 | 0 | 0 | 0 | 0 |
| 0 | 0 | 0 | 0 | 0 | 0 |
| +1 | +1 | +1 | +1 | 0 | 0 |
| 0 | 0 | 0 | +1 | 0 | 0 |
| 0 | 0 | 0 | +1 | 0 | 0 |
| 0 | 0 | 0 | +1 | 0 | 0 |

Adjusted P-plane

| | | | | | |
|---|---|---|---|---|---|
| 1 | 1 | 1 | 1 | 1 | 1 |
| 1 | 1 | 1 | 1 | 1 | 1 |
| 1 | 1 | 1 | 2 | 1 | 1 |
| 0 | 0 | 1 | 1 | 1 | 1 |
| 0 | 0 | 0 | 2 | 1 | 1 |
| 0 | 0 | 1 | 1 | 1 | 1 |

FIG. 6

F-plane

| | | | | | |
|---|---|---|---|---|---|
| 0 | 0 | 0 | 0 | 0 | 0 |
| 0 | 0 | 0 | 0 | 0 | 0 |
| 0 | 0 | 75 | 75 | 306 | 306 |
| 0 | 0 | 75 | 75 | 306 | 306 |
| 0 | 0 | 75 | 75 | 306 | 306 |
| 0 | 0 | 75 | 75 | 306 | 306 |

F plane Halftone

| | | | | | |
|---|---|---|---|---|---|
| 0 | 0 | 0 | 0 | 0 | 0 |
| 0 | 0 | 0 | 0 | 0 | 0 |
| 0 | 0 | 1 | 1 | 3 | 3 |
| 0 | 0 | 1 | 1 | 3 | 3 |
| 0 | 0 | 1 | 1 | 3 | 3 |
| 0 | 0 | 1 | 1 | 3 | 3 |

P-plane adjustment

| | | | | | |
|---|---|---|---|---|---|
| 0 | 0 | 0 | 0 | 0 | 0 |
| 0 | 0 | 0 | 0 | +1 | +1 |
| 0 | 0 | 0 | +1 | 0 | 0 |
| 0 | 0 | 0 | +1 | 0 | 0 |
| 0 | 0 | 0 | +1 | 0 | 0 |
| 0 | 0 | 0 | +1 | 0 | 0 |

Adjusted P-plane

| | | | | | |
|---|---|---|---|---|---|
| 1 | 1 | 1 | 1 | 1 | 1 |
| 1 | 1 | 1 | 1 | 2 | 2 |
| 0 | 0 | 0 | 2 | 1 | 1 |
| 0 | 0 | 1 | 1 | 1 | 1 |
| 0 | 0 | 0 | 2 | 1 | 1 |
| 0 | 0 | 1 | 1 | 1 | 1 |

FIG. 7

DETERMINING PRINTING FLUID AMOUNTS BASED ON COLORANT BOUNDARIES

BACKGROUND

In printing systems, a print agent, such as an ink colorant, may be deposited onto a printable substrate at various locations in accordance with data representing an image to be printed. During a printing operation, different amounts of print agent may be deposited at various locations of a substrate. In cases where a relatively large amount of print agent is deposited at a location adjacent to or near a location where a relatively small amount of print agent has been deposited, print agent may flow from one region to another. Print agent flowing from one region to another is sometimes referred to as bleeding. Bleeding may lead to the occurrence of a visible print quality defects.

BRIEF DESCRIPTION OF DRAWINGS

Examples will now be described, by way of non-limiting example, with reference to the accompanying drawings, in which:

FIG. 5 is an illustration of printing fluid amounts according to some examples;

FIG. 6 is an illustration of determining printing fluid amounts according to some examples;

FIG. 7 is an illustration of determining printing fluid amounts according to some examples;

DETAILED DESCRIPTION

A printer may utilize a color separation process to print an image to a substrate. For example, image data may include color data represented in a 3D color space, such as pixel-level image color representations in a red-green-blue (RGB) color space, a CIELAB color space, a cyan-magenta-yellow (CMY) color space, or the like. That is, image data may include colorimetric tristimulus values. A color separation process determines how colorimetric tristimulus values are represented by corresponding colorant channels. For example, a printer may be able to deposit cyan, magenta, yellow and black (CMYK) colorants (e.g., ink or toner) to a substrate and a color separation may be used to calculate how colorimetric tristimulus values are represented using combinations of the colorants. Further, a halftoning process may be utilized to derive how particular amounts of colorants are deposited to particular locations on a substrate. It should be noted that in some cases, a printer may include additional colorants. For example, for applications, such as, banner and poster printing, a printer that deposits water-based latex inks may be utilized. In some examples, a printer that deposits water-based latex inks may include the following latex inks: white, black, cyan, magenta, yellow, light cyan, and light magenta. Further, a printer may deposit an overcoat print agent and an optimizer print agent.

An optimizer print agent may be referred to as a print agent fixer, a treatment fluid, and a pretreatment. A pretreatment may be applied to a substrate prior to the colorants being deposited. The application of a pretreatment may reduce colorant bleeding, i.e., pretreatment may fixate ink and prevent movement. Movement of print agent may occur from a region of relatively higher print agent saturation to a region of relatively lower print agent saturation, either during or after a printing operation, and can lead to quality defects wherein parts of the printed image do not appear as intended. This disclosure describes techniques for applying pretreatment to a substrate. According to the techniques herein, pretreatment may be selectively applied such that occurrences of bleeding may be reduced. Specifically, the techniques described herein provide examples which may reducing bleeding corresponding to particular colorant boundaries. It should be noted that while the examples below are described with respect to specific printing technologies (e.g., printing using latex inks), the techniques described herein may be generally applicable to any type of printing technology.

Figure 1:
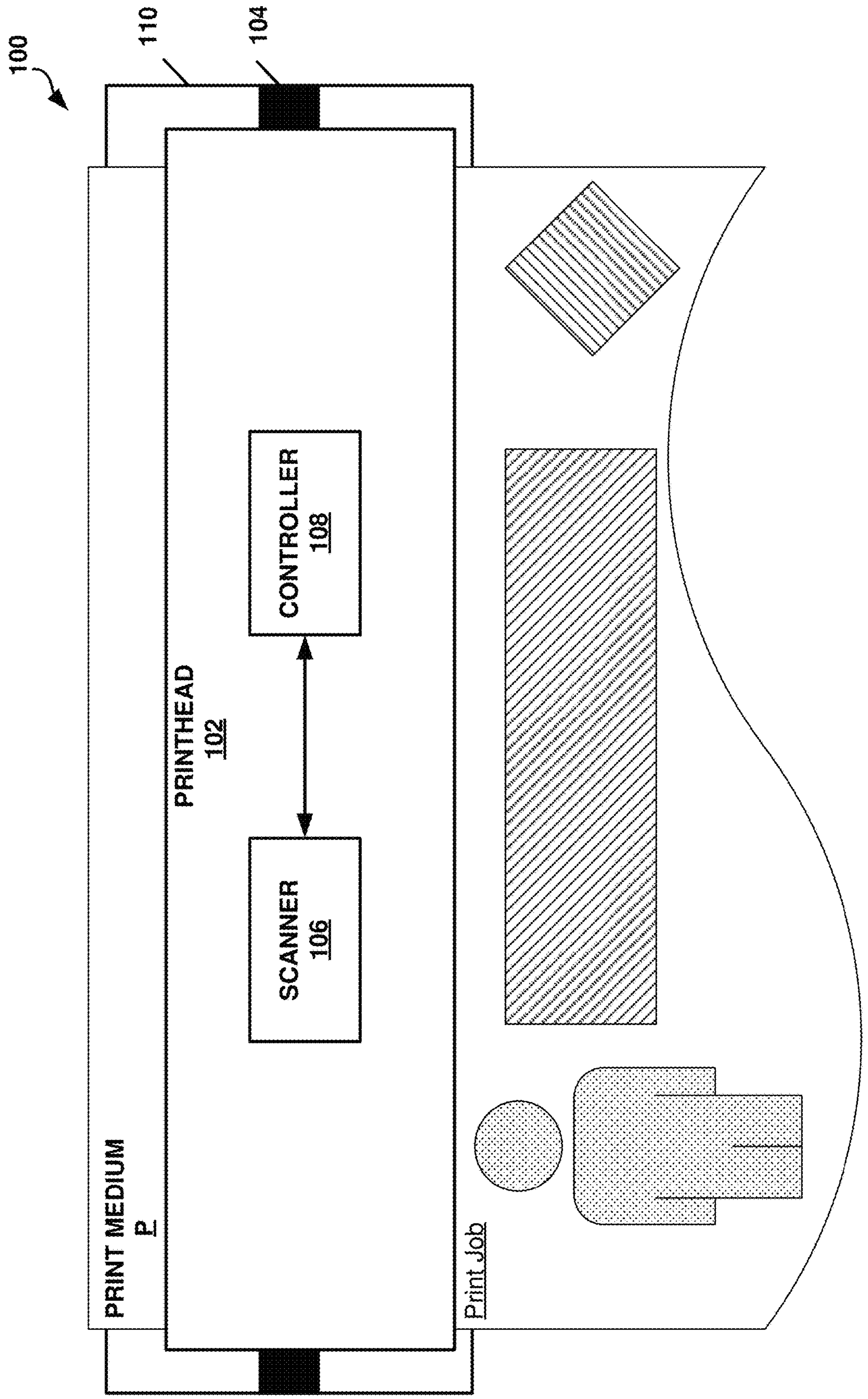
FIG. 1 is an illustration of an example printer device according to an example.

FIG. 1 is an illustration of a printer device 100 according to an example. In the example illustrated in FIG. 1, printer device 100 comprises printhead carriage 102, printhead support structure 104, scanner 106, controller 108, and print medium support assembly 110. Printhead carriage 102 may form part of a page wide array printer and include printheads which extend across the width of a print medium P. It should be noted that in other examples, a printhead carriage may be moveable to traverse the width of print media. In the example illustrated in FIG. 1, printhead carriage 102 is supported by printhead support structure 104 such that print medium P may advance underneath printhead carriage 104 in a print axis direction. Print medium may comprise a substrate, such as, a sheet or continuous web of media and may include any form of print media, including, but not limited to, paper, cardboard (i.e. corrugated media), fabric, polymer films, and the like. In the example illustrated in FIG. 1, print medium is supported in a print zone by a print medium support assembly 110. Print medium support assembly 110 may apply a vacuum to adhere a portion of the print medium to print medium support assembly 110 while printing fluid is being deposited. It should be noted that for ease of illustration, printhead support structure 104 and print medium support assembly 110 are represented using simplified structures. The techniques described herein are equally applicable to various physical printer configurations.

Printhead carriage 102 may include a plurality of printheads, where a printhead comprises a die forming a plurality of nozzles. The nozzles may be aligned in columns along a length of a printhead. For example, printhead carriage 102 may comprise a plurality of ink-jet printheads. A printing fluid, including, for example, ink (e.g., water based latex ink) or a modelling agent, may be ejected through the nozzles of the printhead. In this manner, printheads included in printhead carriage 102 may deposit print agent onto print medium P thereby printing an image corresponding to a print job. It should be noted that in other examples, a printhead may include a thermal or piezo-electric printhead. It should be noted that ink is used herein as an example, and in other examples, other printing fluids and agents may alternatively be deposited.

As further illustrated in FIG. 1, printer device 100 includes scanner 106 and controller 108. Scanner 106 may scan a printed image. Scanner 106 may include a reflectance sensor that is arranged to measure an intensity of reflected light (including, e.g., infrared light). For example, scanner 106 may include an emitter to emit light and sensor to measure an intensity of light that is reflected from a surface (e.g., the print medium). The measured intensity of reflected light may indicate whether colorant is deposited to the corresponding location of a print media. Values measured by scanner 106 may be used for printer calibration operations. For example, controller 108 may receive values from scanner and perform printhead alignment calibration operations.

It should be noted that in FIG. 1, controller 108 is illustrated as being located on printhead carriage 102 in proximity to scanner 106. Such an illustration is for the sake of illustrative purposes. That is, controller 108 may be located at various locations within or in proximity to printer device 100 or may be physically independent of printer device 100. For example, controller 108 may comprise a computer system that is electronically coupled or otherwise in communication (e.g., wirelessly) with printer device 100. In one example, controller 108 may comprise a printed circuit board and/or integrated circuitry. Further, in one example, controller 108 may form part of a control subsystem that is electronically-coupled to a wider control system, e.g., controller 108 may be coupled over a system bus to other printed circuit boards. In one example, controller 108 may comprise a processor in the form of a central processing unit, microprocessor or system-on-chip device. Controller 108 may include a memory and/or be electronically coupled to a memory (not shown in FIG. 1). A memory may comprise volatile and/or non-volatile memory. In some examples, the memory may comprise non-volatile memory to store instructions for the controller 108 and configuration data for the printing system. Further, instructions and/or data may be transferred from the non-volatile memory to the volatile memory during operation, wherein, for example, a processor of the controller 108 may access data and instructions stored in the volatile memory. The volatile memory may comprise any form of Random Access Memory (RAM) and the non-volatile memory may comprise solid-state memory, magnetic storage devices, and/or Read Only Memory (ROM), amongst others. Instructions stored in memory may be loaded and executed by a processor of controller 108 to effect the functionality described herein.

In addition to performing calibrations operations, controller 108 may receive print job commands and/or data corresponding to a print job (e.g., image data) from a print job source. A print job source may include a computer or any other source of print jobs. Controller 108 may generate print data such that a print job is executed. In some examples, controller 108 may derive and/or reproduce a print mask from received data. In some examples, the received data itself may already correspond to a print mask. In other examples, a print mask may be dynamically generated during printing of a print job. Further, a print mask may also be stored from the outset in a memory and controller 108 may then dynamically access the print mask during execution of a print job.

Figure 2:
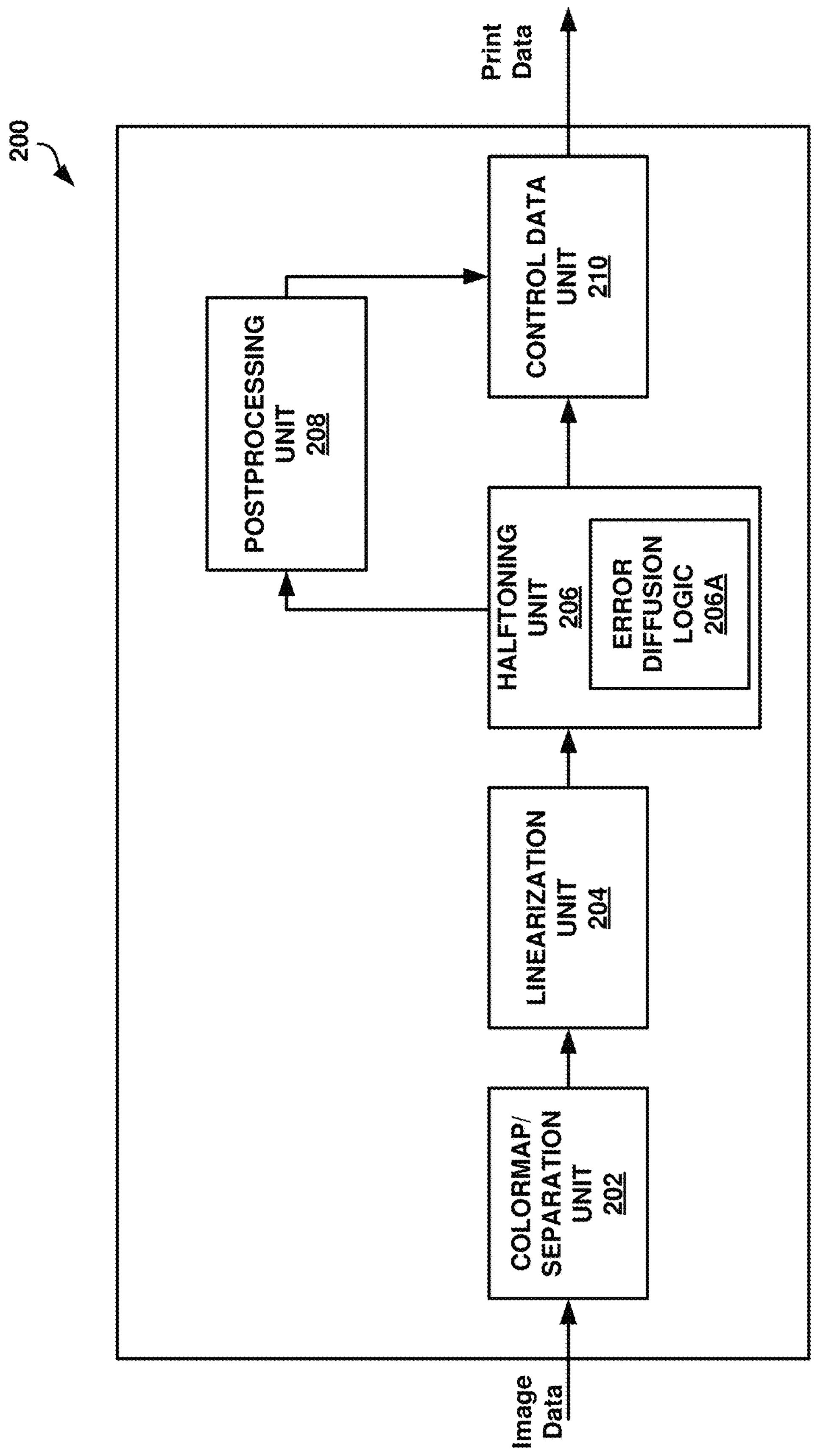
FIG. 2 is a block diagram of a printing pipeline of a printer controller that generates print data according to some examples.

FIG. 2 is a block diagram of a printing pipeline of a printer controller that generates print data according to example techniques described herein. Controller 200 is an example of a controller that may be utilized with various printing systems (e.g., an ink-jet or a laser printer), including, for example, printer device 100. Is some cases, the printing pipeline of controller 200 may be referred to as a printing engine. As illustrated in FIG. 2, the printing pipeline of controller 200 includes colormap/separation unit 202, linearization unit 204, halftoning unit 206, postprocessing unit 208, and control data unit 210. It should be noted that although example controller 200 is illustrated as having distinct functional blocks, such an illustration is for descriptive purposes and does not limit controller 200 and/or sub-components thereof to a particular architecture. Functions of controller 200 may be realized using any combination of physical and logical implementations. That is, a unit can refer to a hardware processing circuit, which can include any or some combination of a microprocessor, a core of a multi-core microprocessor, a microcontroller, a programmable integrated circuit, a programmable gate array, or another hardware processing circuit. Alternatively, a unit can refer to a combination of a hardware processing circuit and machine-readable instructions executable on the hardware processing circuit or machine-readable instructions.

As illustrated in FIG. 2, the printing pipeline receives image data and generates print data. Print data may be used to control printing of an image to a substrate. In the example of FIG. 2, colormap/separation unit 202 receives input image data and generates a color separation. As described above, image data may include image color data represented in a 3D color space. It should be noted that in some examples, colormap/separation unit 202 may map or convert color data from a color space of an input image to another color space. For example, colormap/separation unit 202 may convert RGB color space data to CIELAB color space data and then generate a color separation. Linearization unit 204 may map non-linear color separation data to a linear function.

The output of linearization unit 204 may include an indication of the amount of each colorant corresponding a location of a substrate. Each colorant may be referred to as a channel or plane. For example, if a printer device includes CMYK colorant channels and a region of a substrate is to be represented as pure black, this may be indicated as C=0, M=0, Y=0, and K=255, where values of each of the channels range from 0 to 255, where 0 indicates the minimum intensity and 255 represents the maximum intensity. A halftoning process reproduces a continuous tone image by approximating a continuous tone image to a discrete deposit pattern of printing fluid drops. Examples of halftoning processes include search-based half-toning, matrix halftoning, and error diffusion. Halftoning unit 206 may perform halftoning processes. In the example illustrated in FIG. 2, halftoning unit 206 is illustrated as including error diffusion logic 206A. Error diffusion logic 206A may be utilized by halftoning unit 206 to perform error diffusion. In error diffusion, essentially, the error caused by a particular pixel is calculated and propagated to neighboring pixels or locations in specific proportions (e.g., weights). For example, in some regions of an image, the error may be diffused evenly among unprocessed neighbor locations while, in other regions, the error may be diffused randomly. In some examples, a decision regarding whether or not print fluid is to be deposited at a particular position may be made in a position-dependent manner.

Figure 3:
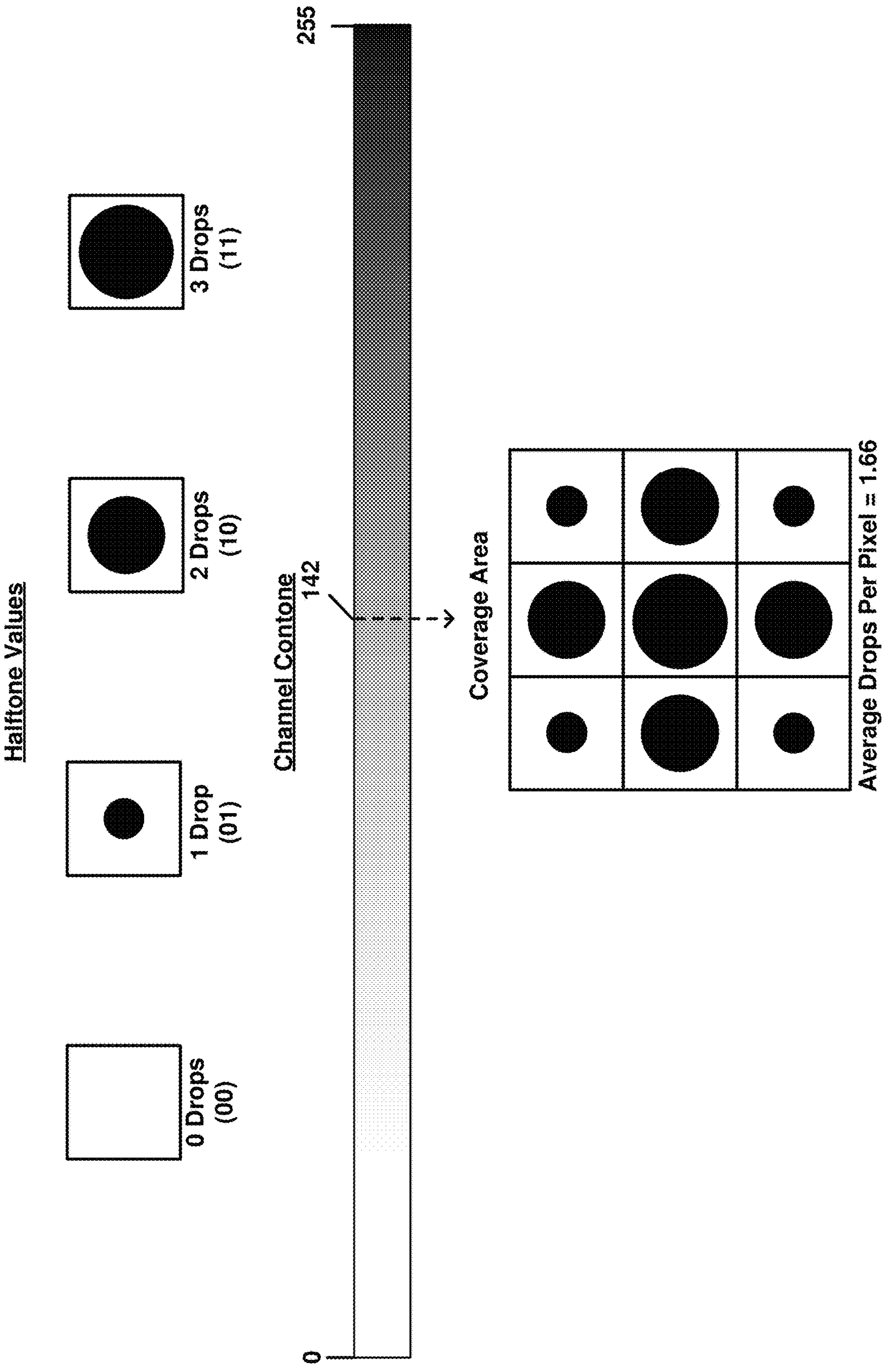
FIG. 3 is an illustration of halftoning according to some examples.

Regardless of the particular halftoning process, halftoning essentially represents color separation data using a discrete pattern of deposited printing fluid dots. FIG. 3 is an illustration of halftone image data according to an example. At the top of FIG. 3, example halftone level values are illustrated. That is, in this example, for each addressable location of a substrate, 0, 1, 2, or 3 drops of a colorant may be deposited. In some cases, the smallest addressable unit on which a drop of printing fluid may be deposited is referred to as a pixel. For example, for a 600 DPI×600 DPI printer, a square inch would include 600×600 pixels. It should be noted that pixels corresponding to these addressable units are distinct from pixels of image data. In FIG. 3, a number of drops that may be deposited per pixel are illustrated using a numeric value and a 2-bit binary representation (i.e., 2 bits per pixel (bpp)). In the example of FIG. 3, 00 indicates 0 drops, 01 indicates 1 drop, 10 indicates 2 drops, and 11 indicates 3 drops. Further, each of number of drops are illustrated with a corresponding saturation illustrated as different sized circles.

In FIG. 3, a gradient representing continuous tone color data, which may be referred to as a contone, is illustrated. As described above, in one example, each channel may have an intensity value ranging from 0 to 255. As illustrated, the gradient ranges from 0% intensity (e.g., 0/225) to 100% intensity (255/255). That is, for example, in the case of a black channel, 0% represents white and 100% represents pure black with percentages in between representing various grayscales. Illustrated below the gradient in FIG. 3 is a coverage pattern corresponding to an intensity. The illustrated example coverage pattern provides a conceptual visualization of halftoning. That is, in the example, for a coverage area including a 3×3 pixel region, an intensity of 142 is provided, which is approximately 55% (i.e., 142/255) intensity. As described above, a halftoning process reproduces a continuous tone image by approximating the continuous tone image to a discrete deposit pattern of printing fluid drops. In one example, a halftoning process may calculate an average number of drops to be deposited per pixel. For example, for intensity values ranging from 0 to 255, a value of 0 would correspond to 0% coverage and thus an average of 0 drops per pixel. Similarly, a value of 255 would correspond to 100% coverage and thus, an average of the maximum number of drops per pixel (e.g., 3). For each intermediate intensity value, an average number of drops may be determined accordingly. For example, as illustrated in FIG. 3, an intensity value of 142 would correspond to approximately 55% and thus, have an average number of drops per pixel of 1.66 (i.e., ~0.553*3). A particular halftoning process may derive how a spatial distribution of a particular average number of drops per pixel is achieved.

Referring again to FIG. 2, control data unit 210 may receive data from a halftoning process and generate print data, e.g., print masks. A print mask may define how drops are deposited. For example, for a multi-pass printing system a print mask may define how drops are deposited during each pass. In some examples, a print data may cause printing fluid to be deposited according to an additive process. As described above, halftone data may be represented using a 2-bit binary representation. In one example, postprocessing unit 208 may perform logical/LUT (Look up table)-based pointwise operations using the halftone data. For example, postprocessing unit 208 may calculate a difference in halftone levels at adjacent locations by comparing respective binary values. Further, postprocessing unit 208 may calculate a total amount of ink at a location. For example, postprocessing unit 208 may add halftone level values for respective channels to calculate a total amount of ink a channel. For example, in the case of CMYK channels each having two drops, postprocessing unit 208 may calculate the total amount of ink as eight drops.

As described above, the application of a pretreatment may reduce bleeding. It should be noted that applying too little pretreatment may cause ink to not fixate on a substrate and applying too much pretreatment may cause coalescence and an unnecessary usage of ink. In one example, pretreatment is applied based on the total amount of printing fluid. For example, the amount of pretreatment applied may be approximately 20% of the amount of printing fluid. For example, one drop of pretreatment may be applied for approximately every five drops of ink. Further, in one example, the amount of pretreatment may be increased at an edge where a relatively large amount of ink (e.g., 8 total drops) is adjacent to a relatively small amount of ink (e.g., 2 total drops). In some examples, edges may be detected based on halftone values.

Figure 4:
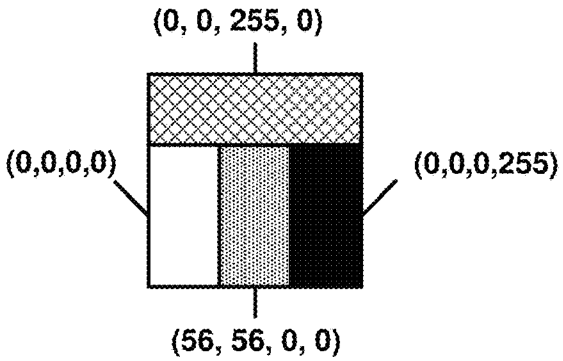
FIG. 4 is an illustration of colorant boundaries and colorant halftone channels according to some examples.

FIG. 4 is an illustration of colorant boundaries and colorant halftone channels according to an example. In the example of FIG. 4, five edge cases are illustrated, i.e., Yellow (0, 0, 255, 0)/White(0, 0, 0, 0); Yellow/Light Blue (56, 56, 0, 0); Yellow/Black (0, 0, 0, 255); White/Light Blue and Light Blue/Black. In the example illustrated in FIG. 4, the edge cases are illustrated using a contone representation and a corresponding halftone representation. It should be noted that the channel halftone data may be referred to as a LUT (Look up Table) for each channel and as described above may include a 2-bit value for at each location. As described above, pretreatment may be applied based on the total amount of printing fluid. FIG. 5 illustrates an example where for a total amount of printing fluid (i.e., total drops of colorant) a corresponding amount of pretreatment applied is provided. In the example illustrated in FIG. 5, the total amount of drops corresponds to the halftone channels illustrated in FIG. 4. Further, the amount of pretreatment is illustrated as P-plane halftone data. That is, in this example, at locations where there are three drops of colorant a drop a pretreatment is applied and for each 2×2 area having eight drops of colorant two drops of pretreatment is applied to these areas. That is, FIG. 5 provides an example where the amount of pretreatment applied is based on the total amount of colorant. It should be noted that P-plane halftone data may be similar to colorant channel data. That is, for example, P-plane halftone data may include a 2-bit binary representation indicating whether 0, 1, 2, or 3 drops of pretreatment are applied.

As described above, in some examples, the amount of pretreatment may be increased at edges. FIG. 6 illustrates an example where edges are detected and pretreatment is increased. In the example of FIG. 6, an F-plane is illustrated. The F-plane in FIG. 6 corresponds to the contone data in FIG. 4. That is, at each location in the 6×6 matrix, an F factor is calculated. In the example of FIG. 6, the factor is computed according to the following equation:

$$\text{Factor} = 0.15^{*}((C + M + Y + K)^{*}8)$$

That is, in this example, contone values are summed, scaled by a factor of 8 and the result is multiplied by scaling factor. Thus, in one example, computing a factor at a location may be more generally expressed as follows:

$$\text{Factor} = a \times \left(\left(\sum_{1}^{\#\,of\ Colorant} \text{Colorant}_i\right) \times N\right)$$

Where,

N is a factor, in one example, N is an integer; and a is a scale factor, in one example, a is in the range of 0 to 1.

It should be noted that N may be selected in order to increase the contone values to increase the resulting halftone values and thus, make it easier to identify boundary regions between an area of high colorant saturation and an area of low colorant saturation. That is, the factor used will affect whether a given ink amount corresponds to one halftone level or another. In other words, the factor N determines which ink differences are detected as edges and which ones are not. Further, a may be selected based on a pretreatment drop weight. It should be noted that the F LUT has the information of the total amount of color ink (in nanograms) fired for a specific contone input and can be created by computing the amount of color ink of a given location, apply a factor to it, and transforming it back to drops using pretreatment drop-weight.

As further illustrated in FIG. 6, for each location in the F-plane a halftone value is determined. In this example, the halftoning process includes determining a halftone level of 0, 1, 2, or 3 according to the following:

$$
\begin{aligned}
&F = 0: && 0;\\
&F = 1\text{–}86: && 1;\\
&F = 87\text{–}170: && 2;\\
&F = >170: && 3;
\end{aligned}
$$

In one example, the halftoning process may include determining a halftone level of 0, 1, 2, or 3 according to the following:

$$
\begin{aligned}
&F = 0\text{–}63: && 0;\\
&F = 64\text{–}127: && 1;\\
&F = 128\text{–}191: && 2;\\
&F = >192: && 3;
\end{aligned}
$$

It should be noted that in other examples, another halftoning process may be used. As further illustrated in FIG. 6, a P-plane adjustment value is determined. As described above, postprocessing unit 208 may perform logical/LUT-based pointwise operations using halftone data. Thus, postprocessing unit 208 may perform operations on the F-plane halftone data. In one example, postprocessing unit 208 may calculate whether the difference in halftone levels between adjacent locations is 2 or 3 levels. That is, the following cases may be identified: 0 to 2; 0 to 3; and 1 to 3. Further, if adjacent locations with differences in halftone levels between 2 or 3 levels are identified, an extra drop of pretreatment is added to the P-plane. This P-plane adjustment is illustrated in FIG. 6. As illustrated, the extra drop of pretreatment may be added to the low saturation location. Finally, FIG. 6 illustrates the P-plane in FIG. 5 with the added adjustment. As illustrated in the example of FIG. 6, for the Yellow/White boundary, Yellow/Light Blue boundary, and the Light Blue/Black boundary additional pretreatment is applied.

It should be noted that for the example illustrated in FIG. 6, the Yellow/Black boundary is not detected because each edge has the same amount of total colorant. However, in practice, bleeding may occur at this type of boundary. That is, bleeding may occur based on amounts of ink and which types of ink are interacting. Different colorants may have different resistances. For example, for a boundary with ink A on one side and ink B on the other side, the amount of bleeding occurring at this edge is determined by both the difference in ink amounts and the resistance of each ink. As described above, if the difference in amounts is large, bleeding will occur from the side that has more ink into the side that has less ink. Further, if the ink amounts are similar and the difference in resistances is large, then bleeding will occur from the ink that has more resistance to the one that has less. In the case of yellow and black ink, yellow ink may have a smaller resistance than black ink. Thus, in this case, black ink will bleed into the yellow ink region.

In one example, according to the techniques herein, the resistance of each ink may be codified such that edge detection may be triggered, even if ink amounts are similar, and additional pretreatment may be applied. That is, in one example according to the techniques herein, an F-plane may be created where a factor at a location is computed as follows:

$$\text{Factor} = a \times \left(\left(\sum_{1}^{\#\ of\ Colorant} \text{Colorant}_i \times w_i\right) \times N\right)$$

Where,

N is a factor, in one example, N is an integer; and a is a scale factor, in one example, a is in the range of 0 to 1;

$w_i$ is a weight corresponding to a resistance of a colorant, in one example, $w_i$ is in the range of 0 to 1.

FIG. 7 illustrates an example where edges are detected and pretreatment is increased. The F-plane in FIG. 7 corresponds to the contone data in FIG. 4. The example in FIG. 7 is similar to the example illustrated in FIG. 6. However, in the example illustrated in FIG. 7, the factor is computed according to the following equation:

$$\text{Factor} = 0.15^*((w_1{}^*C + w_2{}^*M + w_3{}^*Y + w_4{}^*K)^*8)$$

Where, $$w_1, w_2, w_4 = 1; \text{ and } w_3 = 0$$

In this example, yellow is determined to have such a small resistance compared to the other inks and a weight of 0 is applied to yellow. It should be noted that in other examples, other weights may be applied for each of the colorants. As illustrated in FIG. 7, compared to the example in FIG. 6, the change in the F-plane results in a change to the F-plane halftone data and the P-plane adjustment, resulting in a different P-plane. That is, as illustrated in FIG. 7, additional pretreatment is applied at the Yellow/Black boundary. It should be noted that there are additional locations in the P-plane of FIG. 7 which differ from that of FIG. 6. Depending on a property of an image being printed these differences may be considered acceptable and ultimately improve overall image quality by reducing the overall appearance of visual artifacts. Further, it should be noted that overall the P-plane in FIG. 7 includes fewer total drops than the P-plane in FIG. 6 (i.e., 30 vs. 31). In this manner, overall pretreatment usage may be reduced and/or the approximately the same amount may be used while mitigating artifacts caused by specific boundaries. It should be noted that for some media there exists a trade-off with the optimizer level between bleed and other defects, like impinging marks. By applying pretreatment according to the techniques here, impinging marks may be improved because artifacts due to bleeding are less visible. According to the techniques herein, robustness for difficult plots with several ink density changes inside the image may be improved.

Figure 8:
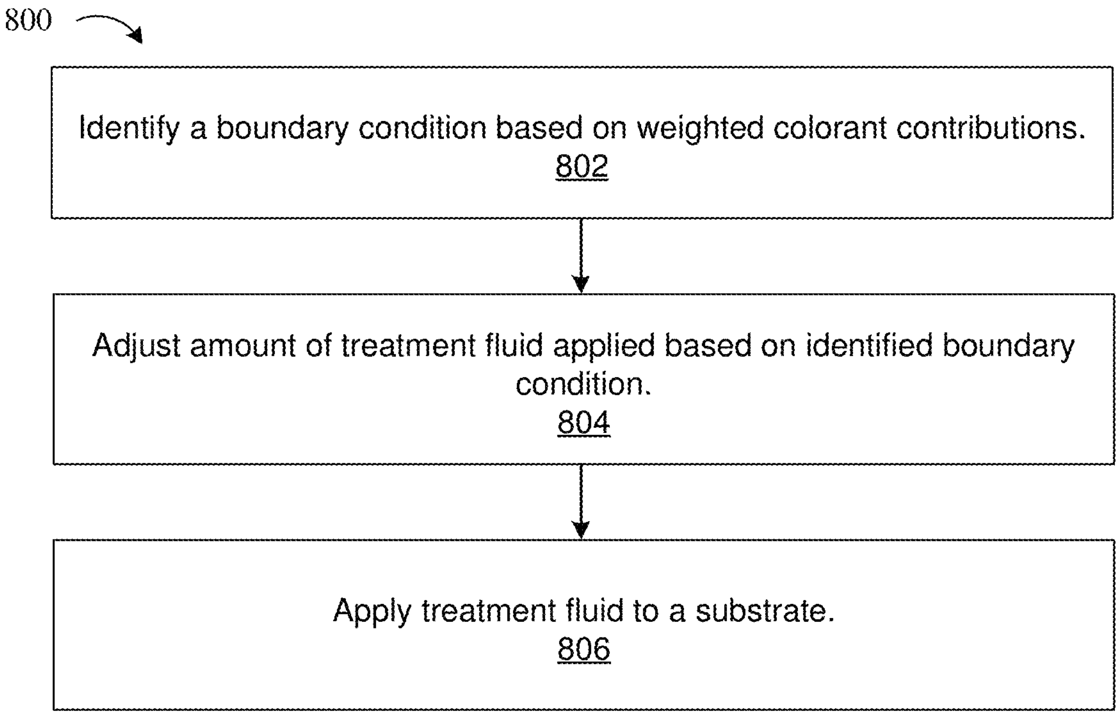
FIG. 8 is a flowchart illustrating a process for determining printing fluid amounts according to an example.

FIG. 8 is a flowchart illustrating a process for determining treatment amounts according to an example. It should be noted that process 800 may be utilized in preparation for a print job and/or during the process of initiating a print job. In one example, the entirety, or aspects thereof, of process 800 may be performed by printer device 100 and/or controller 200. In one example, the entirety, or aspects thereof, of process 800 may be performed by a computing device in communication with printer device 100 and/or controller 200, for example, information pertaining to a treatment amount may be transmitted from a computing device to printer device 100.

Referring to FIG. 8, at 802, a boundary condition is identified based on weighted colorant contributions. For example, controller 200 may generate F-plane halftone data and identify halftone level differences of 2 or 3, as described above. At 804, the amount of treatment fluid applied is adjusted based on an identified boundary condition. For example, controller 200 may cause an extra drop of pretreatment to be added to the low halftone level location, as described above. At 806, treatment fluid may be applied to a substrate. For example, printer device 100 may cause treatment fluid to be deposited to a substrate, as described above. In this manner, printer device 100 represents a device to identify, in a source image to be printed, a boundary condition between a first region including a first colorant and a second region including a second colorant based on a difference of respective weighted colorant contributions of the first colorant and the second colorant exceeding a threshold and in response to identifying the boundary condition, apply additional treatment fluid.

Figure 9:
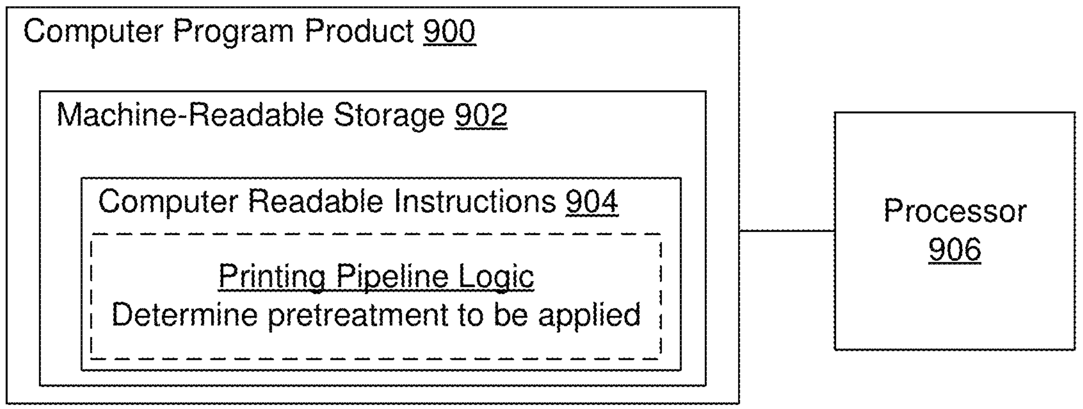
FIG. 9 is a block diagram illustrating a computer program product according to an example.

FIG. 9 illustrates a block diagram of an example computer program product 900. In some examples, as shown in FIG. 9, computer program product 900 includes a machine-readable storage 902 that may also include computer readable instructions 904. In some implementations, the machine-readable storage 902 may be implemented as a non-transitory machine-readable storage. In an example, the computer readable instructions 904 may be executed by a processor 906 and implement aspects of process 800, described above. That is, printing pipeline logic illustrated FIG. 9 may include aspects of process 800.

Figure 10:
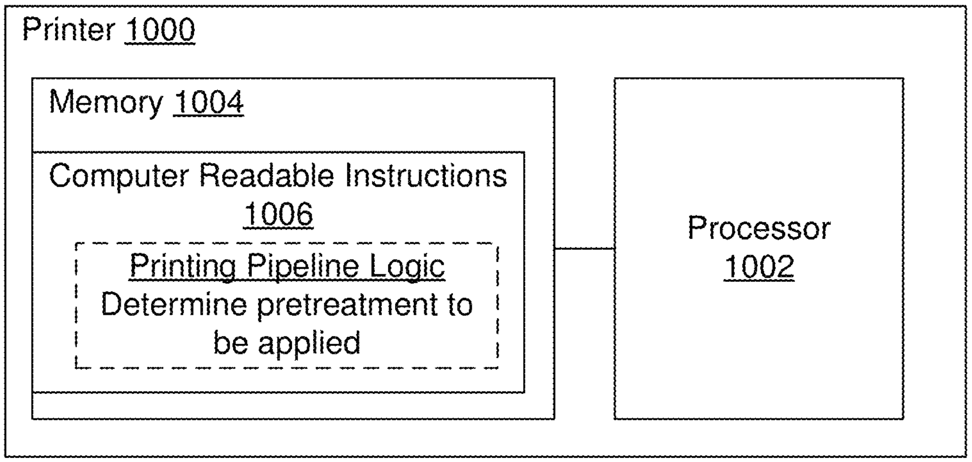
FIG. 10 is a block diagram illustrating an example fluid delivery apparatus according to an example.

FIG. 10 is a block diagram illustrating a hardware apparatus including a semiconductor package according to an example. FIG. 10 shows an illustrative example of a printer 1000. In the illustrated example, the printer 1000 may include a processor 1002 and a memory 1004 communicatively coupled to the processor 1002. The memory 1004 may include computer readable instructions 1006. In an example, the computer readable instructions 1006, may be executed by the processor 1002 and implement aspects of process 800, described above. That is, printing pipeline logic illustrated in FIG. 10 may include aspects of process 800.

In some implementations, the processor 1002 may include a general purpose controller, a special purpose controller, a storage controller, a storage manager, a memory controller, a micro-controller, a general purpose processor, a special purpose processor, a central processor unit (CPU), the like, and/or combinations thereof. Further, implementations may include distributed processing, component/object distributed processing, parallel processing, the like, and/or combinations thereof. For example, virtual computer system processing may implement the methods or functionalities as described herein, and the processor 1002 described herein may be used to support such virtual processing.

In some examples, memory 1004 is an example of a computer-readable storage medium. For example, memory 1004 may be any memory which is accessible to the processor 1002, including, but not limited to RAM memory, registers, and register files, the like, and/or combinations thereof. References to "computer memory" or "memory" should be interpreted as possibly being multiple memories. The memory may for instance be multiple memories within the same computer system. The memory may also be multiple memories distributed amongst multiple computer systems or computing devices.

Figure 11:
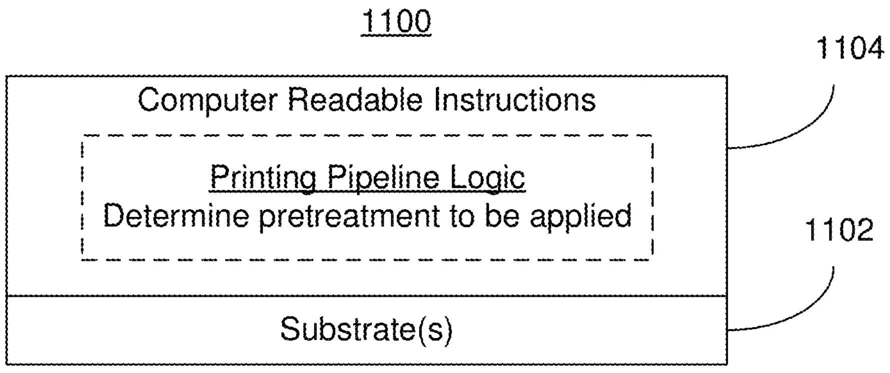
FIG. 11 is a block diagram illustrating a hardware apparatus including a semiconductor package according to an example.

FIG. 11 shows an illustrative semiconductor apparatus 1100 (e.g., chip and/or package). The illustrated apparatus 1100 includes substrates 1102 (e.g., silicon, sapphire, or gallium arsenide) and computer readable instructions 1104 (such as, configurable computer readable instructions) and/or fixed-functionality computer readable instructions (e.g., hardware)) coupled to the substrate(s) 1102. In an example, the computer readable instructions 1104 implement aspects of process 800. That is, printing pipeline logic illustrated in FIG. 11 may include aspects of process 800.

In some implementations, computer readable instructions 1104 may include transistor array and/or other integrated circuit/IC components. For example, configurable logic and/or fixed-functionality hardware logic implementations of the computer readable instructions 1104 may include configurable computer readable instructions such as, for example, programmable logic arrays (PLAs), field programmable gate arrays (FPGAs), complex programmable logic devices (CPLDs), or fixed-functionality computer readable instructions (e.g., hardware) using circuit technology such as, for example, application specific integrated circuit (ASIC), complementary metal oxide semiconductor (CMOS) or transistor-transistor logic (TTL) technology, the like, and/or combinations thereof.

All definitions, as defined and used herein, should be understood to control over dictionary definitions, definitions in documents incorporated by reference, and/or ordinary meanings of the defined terms.

Furthermore, for ease of understanding, certain functional blocks may have been delineated as separate blocks; however, these separately delineated blocks should not necessarily be construed as being in the order as discussed or otherwise presented herein. For example, some blocks may be able to be performed in an alternative ordering, simultaneously, etc.

Although a number of illustrative examples are described herein, that numerous other modifications and examples can be devised that will fall within the spirit and scope of the principles of the foregoing disclosure. More particularly, reasonable variations and modifications are possible in the component parts and/or arrangements of the subject combination arrangement within the scope of the foregoing disclosure, the drawings and the appended claims without departing from the spirit of the foregoing disclosure. In addition to variations and modifications in the component parts and/or arrangements, alternative uses will also be apparent. The examples may be combined to form additional examples.

The invention claimed is:

1. A method comprising:

identifying, in a source image to be printed, a boundary condition between a first region including a first colorant and a second region including a second colorant based on a difference of respective weighted colorant contributions of the first colorant and the second colorant exceeding a threshold, wherein a weighted colorant contribution is determined based on an amount of a colorant and a resistance of the colorant, the resistance of colorant relating to an amount of colorant bleeding; and in response to identifying the boundary condition, applying additional treatment fluid.

2. The method of claim 1, wherein each colorant is an ink and a weight assigned to each colorant is based on a resistance of the ink.

3. The method of claim 2, wherein first colorant and second colorants are selected from cyan, magenta, yellow, and black inks and yellow ink is assigned a lowest weight of any of the inks.

4. The method of claim 2, wherein the first colorant is yellow ink and is assigned a weight of 0.

5. The method of claim 1, wherein applying additional treatment fluid includes increasing a treatment fluid halftone level.

6. The method of claim 1, wherein weighted colorant contributions are represented using halftone levels.

7. A printer device, comprising:

a printing engine to form an image on a print medium using multiple colorants; and a controller to:

identify, in a source image to be printed, a boundary condition between a first region including a first colorant and a second region including a second colorant based on a difference of respective weighted colorant contributions of the first colorant and the second colorant exceeding a threshold, wherein a weighted colorant contribution is determined based on an amount of a colorant and a resistance of the colorant, the resistance of colorant relating to an amount of colorant bleeding; and in response to identifying the boundary condition, apply additional treatment fluid.

8. The printer device of claim 7, wherein each colorant is an ink and a weight assigned to each colorant is based on a resistance of the ink.

9. The printer device of claim 8, wherein first colorant and second colorants are selected from cyan, magenta, yellow, and black inks and yellow ink is assigned the lowest weight of any of the inks.

10. The printer device of claim 8, wherein the first colorant is yellow ink and is assigned a weight of 0.

11. The printer device of claim 7, wherein applying additional treatment fluid includes increasing a treatment fluid halftone level.

12. The printer device of claim 7, wherein weighted colorant contributions are represented using halftone levels.

13. A tangible non-transitory machine-readable medium comprising a set of instructions which, when executed by a processor, cause the processor to:

identify, in a source image to be printed, a boundary condition between a first region including a first colorant and a second region including a second colorant based on a difference of respective weighted colorant contributions of the first colorant and the second colorant exceeding a threshold, wherein a weighted colorant contribution is determined based on an amount of a colorant and a resistance of the colorant, the resistance of colorant relating to an amount of colorant bleeding; and in response to identifying the boundary condition, apply additional treatment fluid.

14. The tangible non-transitory machine-readable medium of claim 13, wherein each colorant is an ink and a weight assigned to each colorant is based on a resistance of the ink.

15. The tangible non-transitory machine-readable medium of claim 14, wherein first colorant and second colorants are selected from cyan, magenta, yellow, and black inks and yellow ink is assigned the lowest weight of any of the inks.

16. The tangible non-transitory machine-readable medium of claim 14, wherein the first colorant is yellow ink and is assigned a weight of 0.

17. The tangible non-transitory machine-readable medium of claim 13, wherein applying additional treatment fluid includes increasing a treatment fluid halftone level.

* * * * *